(12) United States Patent
Kurachi et al.

(10) Patent No.: US 12,489,352 B2
(45) Date of Patent: Dec. 2, 2025

(54) GATE DRIVE CIRCUIT AND POWER CONVERSION DEVICE

(71) Applicant: Mitsubishi Electric Corporation, Tokyo (JP)

(72) Inventors: Shinya Kurachi, Tokyo (JP); Takayoshi Miki, Tokyo (JP); Shota Morisaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 205 days.

(21) Appl. No.: 18/254,430

(22) PCT Filed: Dec. 24, 2020

(86) PCT No.: PCT/JP2020/048529

§ 371 (c)(1),
(2) Date: May 25, 2023

(87) PCT Pub. No.: WO2022/137452

PCT Pub. Date: Jun. 30, 2022

(65) Prior Publication Data

US 2024/0006976 A1    Jan. 4, 2024

(51) Int. Cl.
*H02M 1/08*     (2006.01)
*H02M 1/00*     (2006.01)
*H02M 1/088*    (2006.01)

(52) U.S. Cl.
CPC .......... *H02M 1/0009* (2021.05); *H02M 1/08* (2013.01); *H02M 1/088* (2013.01)

(58) Field of Classification Search
CPC ....... H02M 1/0009; H02M 1/08; H02M 1/088
See application file for complete search history.

(56) References Cited

U.S. PATENT DOCUMENTS

2005/0146295 A1    7/2005   Miyamoto et al.
2016/0261187 A1*   9/2016   Deng .................. H02M 3/1588
(Continued)

FOREIGN PATENT DOCUMENTS

JP    2005198406 A    7/2005
JP    2007089335 A    4/2007
(Continued)

OTHER PUBLICATIONS

International Search Report (PCT/ISA/210) with translation and Written Opinion (PCT/ISA/237) mailed on Mar. 23, 2021, by the Japan Patent Office as the International Searching Authority for International Application No. PCT/JP2020/048529. (11 pages).

(Continued)

*Primary Examiner* — Alex Torres-Rivera
(74) *Attorney, Agent, or Firm* — Buchanan Ingersoll & Rooney PC

(57) ABSTRACT

A gate drive circuit includes a resistor, a current detector that detects a current flowing through the resistor, and a gate driver. The gate driver applies an electric signal between a gate terminal and a source terminal of a module to drive a switching semiconductor element. One end of the resistor is connected to a drain terminal, the opposite end of the resistor is connected to one end of the current detector, and the opposite end of the current detector is connected to the gate driver. The current detector outputs a detection value of the current to the gate driver, and the gate driver changes a gate drive speed of the switching semiconductor element according to the detection value.

11 Claims, 6 Drawing Sheets

(56) References Cited

U.S. PATENT DOCUMENTS

| | | |
|---|---|---|
| 2017/0005570 A1 | 1/2017 | Nakashima et al. |
| 2019/0260200 A1* | 8/2019 | Sawano ................ H02H 3/087 |
| 2019/0260289 A1* | 8/2019 | Leisten ............... H02M 1/4225 |
| 2021/0258004 A1* | 8/2021 | Akiyama .............. H02M 1/088 |

FOREIGN PATENT DOCUMENTS

| | | |
|---|---|---|
| JP | 2018088728 A | 6/2018 |
| WO | 2015121931 A1 | 8/2015 |

OTHER PUBLICATIONS

Examination Report dated Jun. 19, 2025, issued in the corresponding Indian Patent Application No. 202327035471, 6 pages.

* cited by examiner

GATE DRIVE CIRCUIT AND POWER CONVERSION DEVICE

FIELD

The present disclosure relates to a gate drive circuit that drives a switching semiconductor element, and a power conversion device including the gate drive circuit.

BACKGROUND

A power conversion device, such as an inverter device, a servo amplifier device, or a switching power supply device, includes a power conversion main circuit incorporating one or a plurality of switching semiconductor elements. In a switching semiconductor element, a conduction state between a drain main terminal and a source main terminal changes according to an electric signal applied between a gate terminal and a source terminal. A gate drive circuit receives a command signal from a higher-level controller, and applies an electric signal between a gate terminal and a source terminal of a switching semiconductor element to drive the switching semiconductor element.

As a detection value representing a drive state of a switching semiconductor element, the voltage between main terminals of the switching semiconductor element has been directly detected and transmitted to a gate drive circuit. One of the purposes of detecting the voltage between the main terminals is to change the switching drive speed of the switching semiconductor element based on the drive state of the switching semiconductor element. By changing the switching drive speed of the switching semiconductor element, the loss of the switching semiconductor element can be reduced. Another purpose of detecting the voltage between the main terminals is to prevent an excessive high voltage that can be applied to the switching semiconductor element.

The first embodiment of Patent Literature 1 discloses a configuration in which a voltage divider circuit with a plurality of resistors connected in series is provided between a first main terminal and a second main terminal of a switching semiconductor element, and a divided voltage divided by the voltage divider circuit is detected and transmitted to a gate drive circuit.

Meanwhile, parasitic capacitance exists in an electronic circuit board on which the voltage divider circuit is installed. In addition, parasitic capacitance also exists in the wiring connecting the voltage divider circuit and the switching semiconductor element. The parasitic capacitance causes a decrease in accuracy of detection voltage output from the voltage divider circuit. For this reason, the second embodiment of Patent Literature 1 discloses a configuration in which a capacitor is connected in parallel with a resistor constituting a voltage divider circuit. In the case of this configuration, since the parasitic capacitance in the electronic circuit board and the connection wiring can be compensated, it is possible to prevent a decrease in accuracy of detection voltage output from the voltage divider circuit.

CITATION LIST

Patent Literature

Patent Literature 1: Japanese Patent Application Laid-open No. 2007-89335

SUMMARY

Technical Problem

However, the technique disclosed in the second embodiment of Patent Literature 1 requires a capacitor to be connected to a resistor constituting a voltage divider circuit, which is a problem that the number of components increases and a detector increases in size.

The present disclosure has been made in view of the above, and a purpose of the present disclosure is to obtain a gate drive circuit capable of preventing an increase in size of a detector that detects a detection value representing a drive state of a switching semiconductor element while preventing a decrease in accuracy of the detection value.

Solution to Problem

In order to solve the above problem and achieve the purpose, a gate drive circuit according to the present disclosure is a gate drive circuit that drives a semiconductor element module including at least one switching semiconductor element including a gate electrode, a drain electrode, and a source electrode, a gate terminal connected to the gate electrode, a drain terminal connected to the drain electrode, and a source terminal connected to the source electrode. The gate drive circuit includes a resistor, a current detector that detects a current flowing through the resistor, and a gate driver. The gate driver applies an electric signal between the gate terminal and the source terminal to drive the switching semiconductor element. One end of the resistor is connected to the drain terminal, the opposite end of the resistor is connected to one end of the current detector, and the opposite end of the current detector is connected to the gate driver. The current detector outputs a detection value of the current to the gate driver, and the gate driver changes a gate drive speed of the switching semiconductor element according to the detection value.

Advantageous Effects of Invention

A gate drive circuit according to the present disclosure has an effect of preventing an increase in size of a detector that detects a detection value representing a drive state of a switching semiconductor element while preventing a decrease in accuracy of the detection value.

DESCRIPTION OF EMBODIMENTS

Hereinafter, a gate drive circuit and a power conversion device according to embodiments of the present disclosure will be described in detail with reference to the accompanying drawings. The following embodiments will describe a case where a power conversion main circuit in the power conversion device is an inverter circuit as an example, but this is not intended to exclude application to other uses. The power conversion main circuit may be a servo amplifier circuit, a switching power supply circuit, or a converter circuit. In the following description, physical connection and electrical connection will not be distinguished from each other, and will be simply referred to as "connection". That is, the term "connection" includes both a case where constituent elements are directly connected to each other and a case where constituent elements are indirectly connected to each other through another constituent element.

First Embodiment

Figure 1:
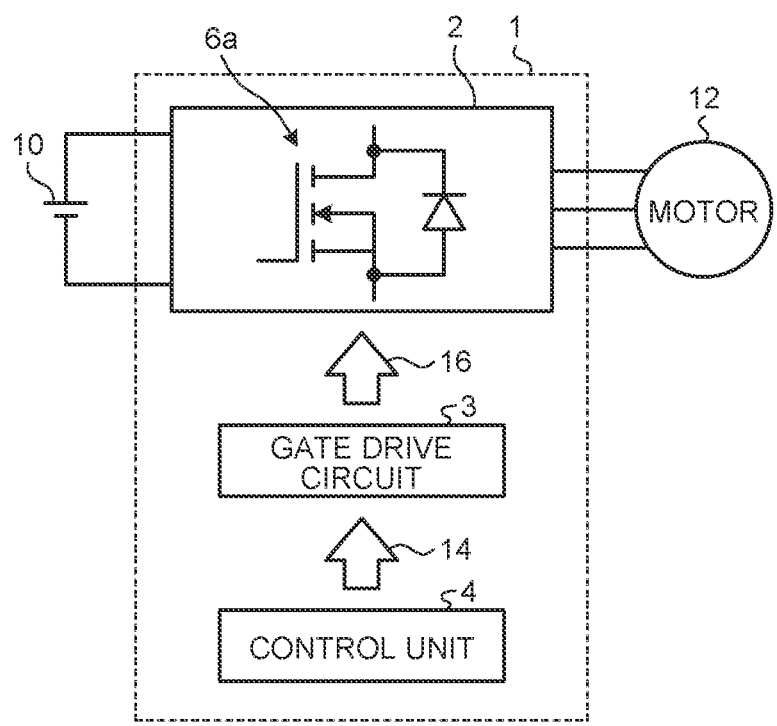
FIG. 1 is a diagram illustrating a configuration example of a power conversion device including a gate drive circuit according to a first embodiment.
Figure 2:
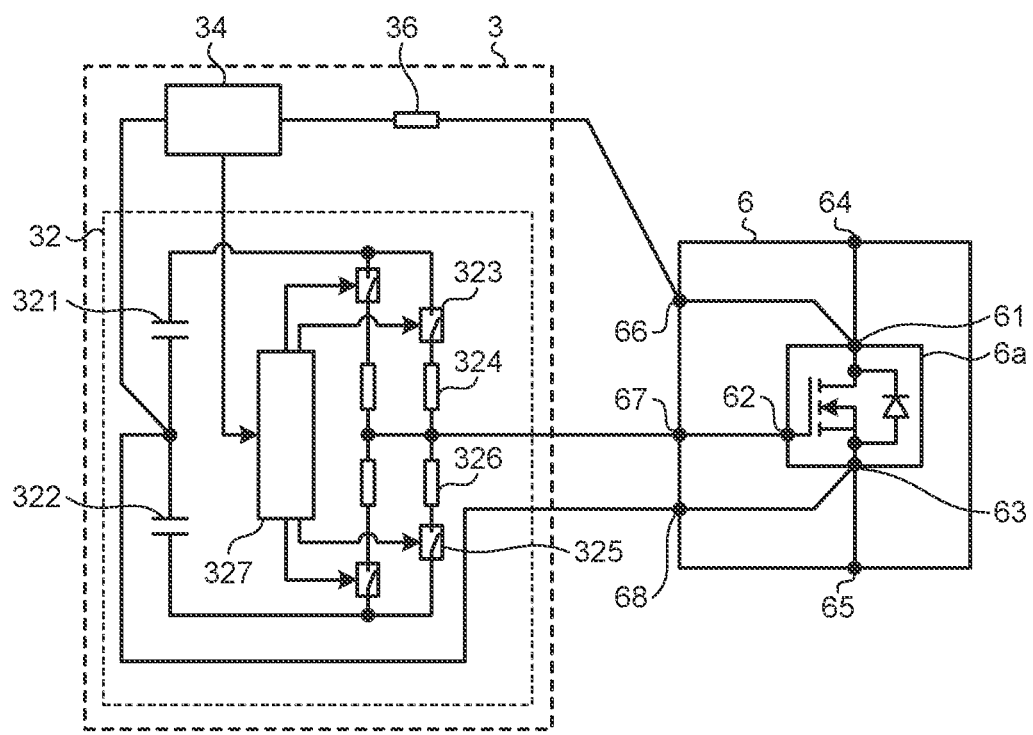
FIG. 2 is a diagram illustrating a detailed configuration of the gate drive circuit according to the first embodiment together with a switching semiconductor element to be driven.

FIG. 1 is a diagram illustrating a configuration example of a power conversion device 1 including a gate drive circuit 3 according to a first embodiment. FIG. 2 is a diagram illustrating a detailed configuration of the gate drive circuit 3 according to the first embodiment together with a switching semiconductor element 6a to be driven.

In FIG. 1, the power conversion device 1 according to the first embodiment includes an inverter circuit 2, a gate drive circuit 3, and a control unit 4. A direct current (DC) power supply 10 is connected to an input terminal of the inverter circuit 2. The DC power supply 10 is a supply source of DC power for applying a DC voltage to the inverter circuit 2, and corresponds to a power supply device, a converter, a power capacitor, or the like.

The inverter circuit 2 is a power conversion circuit that converts DC power supplied from the DC power supply 10 into alternating current (AC) power. The inverter circuit 2 includes at least one switching semiconductor element 6a. As illustrated in FIG. 1, the switching semiconductor element 6a generally includes a transistor element and a diode connected in anti-parallel with the transistor element. In FIG. 1, a Metal-Oxide-Semiconductor Field-Effect Transistor (MOSFET) is illustrated as the switching semiconductor element 6a, but the switching semiconductor element 6a is not limited thereto. Instead of the MOSFET, an Insulated Gate Bipolar Transistor (IGBT) may be used.

A motor 12 as a load is connected to an output terminal of the inverter circuit 2. The motor 12 is driven by AC power supplied from the inverter circuit 2. FIG. 1 illustrates a case where the motor 12 is a three-phase motor as an example. In this case, the inverter circuit 2 has a three-phase circuit configuration. The three-phase circuit configuration includes three legs in which the switching semiconductor element of the upper arm and the switching semiconductor element of the lower arm are connected in series. When the motor 12 is a single-phase motor, the inverter circuit 2 includes two legs.

The control unit 4 generates a control signal 14 for controlling the at least one switching semiconductor element 6a and outputs the control signal 14 to the gate drive circuit 3. The gate drive circuit 3 generates, based on the control signal 14, a drive signal 16 for driving the at least one switching semiconductor element 6a and outputs the drive signal 16 to the inverter circuit 2.

In FIG. 2, the switching semiconductor element 6a that is a MOSFET includes a drain electrode 61, a gate electrode 62, and a source electrode 63. The switching semiconductor element 6a is housed in an electrically insulating case to form a module 6. The module 6 includes a drain main terminal 64, a source main terminal 65, a drain terminal 66, a gate terminal 67, and a source terminal 68. The drain main terminal 64 and the drain terminal 66 are connected to the drain electrode 61 of the switching semiconductor element 6a. The gate terminal 67 is connected to the gate electrode 62 of the switching semiconductor element 6a. The source main terminal 65 and the source terminal 68 are connected to the source electrode 63 of the switching semiconductor element 6a.

As described above, the switching semiconductor element 6a may be an IGBT. In this case, the switching semiconductor element 6a includes a gate electrode while having a collector electrode instead of a drain electrode and an emitter electrode instead of a source electrode. The name of each terminal in the module 6 also changes according to the change in the name of the electrode of the switching semiconductor element 6a, but the effect obtained by the present disclosure does not change. Therefore, in the following description, the term "drain electrode" may include the meaning of "collector electrode", and the term "source electrode" may include the meaning of "emitter electrode".

Although not illustrated in FIG. 2, a load, a power capacitor, a reactor, or another module is connected to the ends of the drain main terminal 64 and the source main terminal 65 of the module 6. When an electrical signal is applied between the gate terminal 67 and the source terminal 68 of the module 6, the electrical signal is applied between the gate electrode 62 and the source electrode 63 of the switching semiconductor element 6a. The switching semiconductor element 6a is switched between an on state and an off state according to the electric signal and performs switching operation. The power conversion device 1 performs power conversion processing by the switching operation of the switching semiconductor element 6a.

In FIG. 2, the gate drive circuit 3 includes a gate driver 32, a current detector 34, and a resistor 36. In the power conversion device 1 according to the first embodiment, each constituent element of the gate drive circuit 3 is installed on an electronic circuit board (not illustrated) and placed on the module 6.

The gate driver 32 includes a positive bias power supply 321 and a negative bias power supply 322. The positive bias power supply 321 and the negative bias power supply 322 are connected in series, and a connection point of the series connection is connected to the source terminal 68 of the module 6. An on-drive switch 323 is connected to a positive electrode of the positive bias power supply 321, and an on-drive gate resistor 324 is connected to the end of the on-drive switch 323. An off-drive switch 325 is connected to a negative electrode of the negative bias power supply 322, and an off-drive gate resistor 326 is connected to the end of the off-drive switch 325. A connection point between the on-drive gate resistor 324 and the off-drive gate resistor 326 is connected to the gate terminal 67 of the module 6. In FIG. 2, the connection order of the on-drive switch 323 and the on-drive gate resistor 324 may be reversed, and the connection order of the off-drive switch 325 and the off-drive gate resistor 326 may be reversed. In addition, in FIG. 2, in order to change the gate drive speed, series circuits each including the on-drive switch 323, the on-drive gate resistor 324, the off-drive gate resistor 326, and the off-drive switch 325 are configured in two parallel. The resistance values of the two on-drive gate resistors 324 are different from each other. In addition, the resistance values of the two off-drive gate resistors 326 are also different from each other.

When the on-drive switch 323 is closed, a voltage from the positive bias power supply 321 is applied between the gate terminal 67 and the source terminal 68 of the module 6 through the on-drive gate resistor 324. Accordingly, the switching semiconductor element 6a is turned on. When the off-drive switch 325 is closed, a voltage from the negative bias power supply 322 is applied between the gate terminal 67 and the source terminal 68 of the module 6 through the off-drive gate resistor 326. Accordingly, the switching semiconductor element 6a is turned off.

The gate driver 32 includes a processor 327. An example of the processor 327 is a Complex Programmable Logic Device (CPLD). The processor 327 can individually change the opening and closing of the on-drive switch 323. When one on-drive switch 323 is closed and the on-drive gate resistor 324 having a large resistance value is used, the on-drive speed of the switching semiconductor element 6a can be reduced because the current flow is small. When the other on-drive switch 323 is closed and the on-drive gate resistor 324 having a small resistance value is used, the on-drive speed of the switching semiconductor element 6a can be increased because the current flow is large. In addition, when both on-drive switches 323 are closed and both on-drive gate resistors 324 are used, the on-drive speed of the switching semiconductor element 6a can further become large because the current flow becomes further larger. In this manner, the gate driver 32 can change the on-drive speed of the switching semiconductor element 6a. The off-drive switch 325 and the off-drive gate resistor 326 have a similar configuration, and the gate driver 32 can change the off-drive speed of the switching semiconductor element 6a.

The features of the gate driver 32 according to the first embodiment are that the resistor 36 and the current detector 34 are included, that one end of the resistor 36 is connected to the drain terminal 66 of the module 6, and that the opposite end of the resistor 36 is connected to one end of the current detector 34. In addition, the opposite end of the current detector 34 is connected to a connection point of the series connection of the positive bias power supply 321 and the negative bias power supply 322 of the gate driver 32.

A high voltage of several hundred volts to several thousand volts can be applied between the drain electrode 61 and the source electrode 63 of the switching semiconductor element 6a. The voltage applied between the drain electrode 61 and the source electrode 63 of the switching semiconductor element 6a is equivalent to the voltage applied between the drain terminal 66 and the source terminal 68 of the module 6, and is equivalent to the voltage applied between the one end of the resistor 36 and the opposite end of the current detector 34. A voltage drop occurring in the current detector 34 is a small value of zero volts or less than several tens of volts. Therefore, the voltage applied between the drain electrode 61 and the source electrode 63 of the switching semiconductor element 6a is mainly applied to both ends of the resistor 36. Then, a current proportional to the voltage applied between the drain electrode 61 and the source electrode 63 of the switching semiconductor element 6a flows through the resistor 36. The current detector 34 detects a current flowing through the resistor 36 and outputs the detected current value to the processor 327 of the gate driver 32. Therefore, the processor 327 can obtain information regarding the voltage applied between the drain electrode 61 and the source electrode 63 of the switching semiconductor element 6a from the output of the current detector 34. In this manner, the gate driver 32 changes the gate drive speed of the switching semiconductor element 6a according to the detection value of the current detector 34.

Parasitic capacitance exists in the electronic circuit board and connection wiring. Parasitic capacitance has a smaller input impedance as the capacitance is larger and as the frequency is higher. Therefore, a high-frequency current can flow through the parasitic capacitance. Here, the power conversion device according to the first embodiment uses the current detector 34. When a voltage detector is used as in the past, the parasitic capacitance existing in the electronic circuit board or connecting wiring can flow through the voltage detector. Since a voltage detector has a large input impedance, the ratio of the current flowing through the parasitic capacitance to the current flowing through the voltage detector becomes large. That is, when a voltage detector is used, the accuracy of the voltage detection decreases.

In the technique disclosed in Patent Literature 1, a capacitor is connected in parallel with a voltage detection resistor to compensate for a decrease in detection accuracy. However, since it is necessary to connect a capacitor to the resistor, the number of components increases, and the voltage detector increases in size.

In contrast, a current detector generally has a small input impedance. Therefore, the ratio of the current flowing through the parasitic capacitance to the current flowing through the current detector becomes small. For this reason, even if parasitic capacitance exists in the electronic circuit board and the wiring, a decrease in accuracy of current detection by the current detector is small.

In this manner, since the current detector 34 is used as a detector that directly detects the voltage applied to the switching semiconductor element 6a in the first embodiment, the highly-accurate and downsized gate drive circuit 3 can be obtained.

In FIG. 2, the one end of the resistor 36 is connected to the drain terminal 66 of the module 6, but the present disclosure is not limited thereto. The one end of the resistor 36 may be connected to the drain main terminal 64 of the module 6. Since both the drain terminal 66 and the drain main terminal 64 of the module 6 are connected to the drain electrode 61 of the switching semiconductor element 6a, the electrical characteristics are not changed, and the effect of the first embodiment can be obtained.

When the gate driver 32 receives information that the voltage applied to the switching semiconductor element 6a is large, the gate driver 32 reduces the gate drive speed of the switching semiconductor element 6a that is currently driven or the switching semiconductor element 6a to be driven next or later. In addition, when the gate driver 32 receives information that the voltage applied to the switching semiconductor element 6a is small, the gate driver 32 increases the gate drive speed of the switching semiconductor element 6a that is currently driven or the switching semiconductor element 6a to be driven next or later. With this control, it is possible to reduce the switching loss while preventing the occurrence of an excessive surge voltage. When the switching loss can be reduced, a cooler that cools the switching semiconductor element 6a can be further reduced in size, and the power conversion device can be further downsized.

In the above, it has been described that the gate drive speed of the switching semiconductor element 6a is changed according to the magnitude of the voltage applied to the switching semiconductor element 6a. However, the gate drive speed may be controlled based on the amount of change per unit time of the voltage applied to the switching semiconductor element 6a. For example, when information indicating that the amount of change per unit time of the voltage applied to the switching semiconductor element 6a is large is received, control is performed to reduce the gate drive speed of the switching semiconductor element 6a. In addition, when information indicating that the amount of change per unit time of the voltage applied to the switching semiconductor element 6a is small is received, control is performed to increase the gate drive speed of the switching semiconductor element 6a.

In addition, the gate driver 32 may deliver the information regarding the detection value of the current detector 34 to another gate driver (not illustrated in FIG. 2) through a signal insulator (not illustrated in FIG. 2). The other gate driver changes the drive speed of another switching semiconductor element (not illustrated in FIG. 2) according to the information regarding the detection value of the current detector obtained through the signal insulator. With this control, the switching loss of another switching semiconductor element can be reduced without providing another current detector. Accordingly, it is possible to further downsize the power conversion device.

Note that, it has been described that the processor 327 is a CPLD in the above, but the processor 327 is not limited to the CPLD. An Application Specific Integrated Circuit (ASIC) or a logic IC may be used instead of the CPLD.

Figure 3:
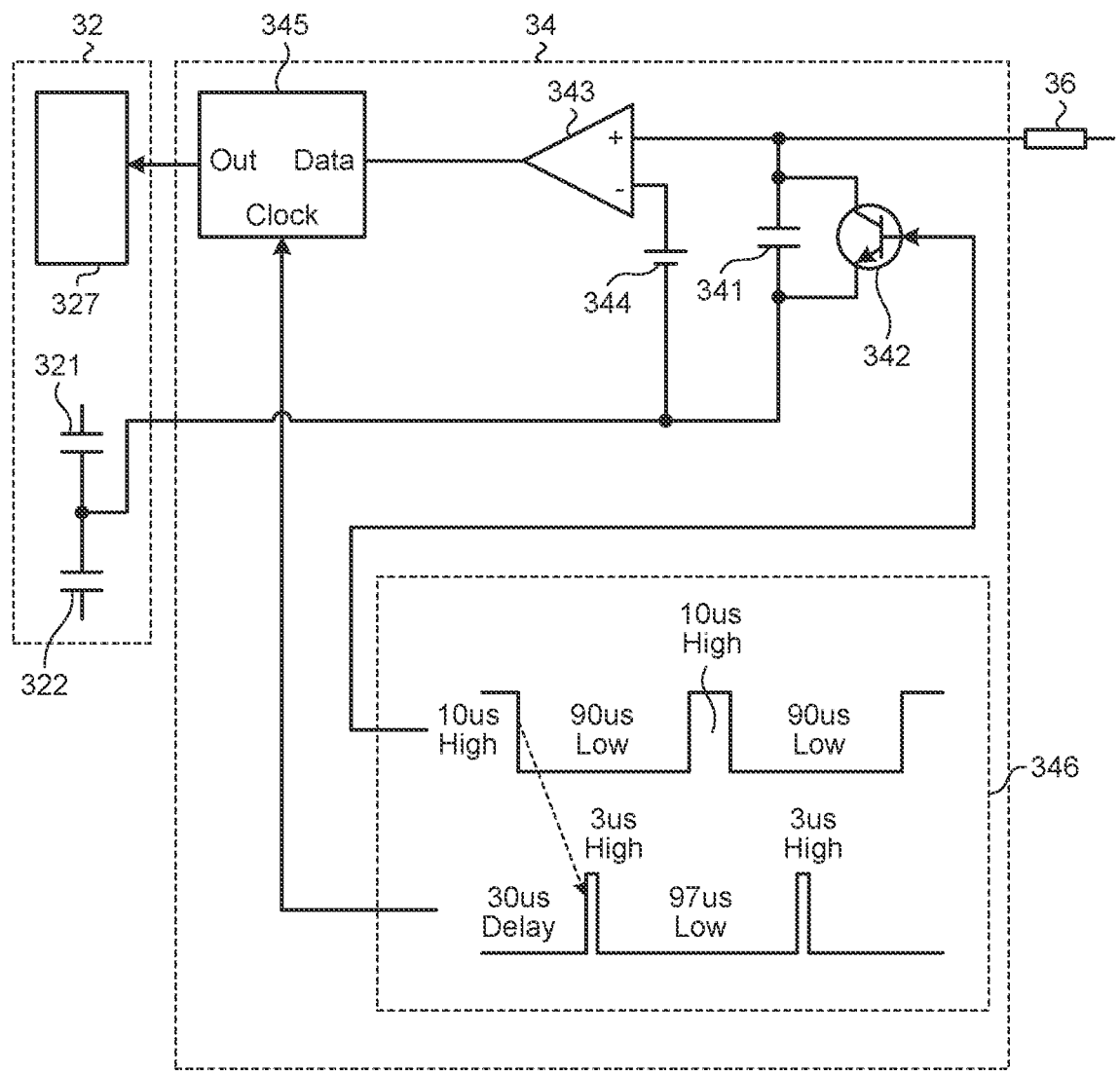
FIG. 3 is a diagram illustrating a first configuration example of a current detector according to the first embodiment together with peripheral components.

Next, configuration examples of the current detector 34 are described. Two examples are described below. FIG. 3 is a diagram illustrating a first configuration example of the current detector 34 according to the first embodiment together with peripheral components.

In FIG. 3, one end of the current detector 34 is connected to the resistor 36, and the opposite end of the current detector 34 is connected to a connection point of series connection of the positive bias power supply 321 and the negative bias power supply 322 of the gate driver 32. The current detector 34 includes a capacitor 341. The capacitor 341 connects the resistor 36 and a positive electrode of the negative bias power supply 322 of the gate driver 32. In addition, a discharge transistor 342 is connected in parallel with the capacitor 341.

When a reference potential of the processor 327 of the gate driver 32 is the positive electrode of the negative bias power supply 322, it is desirable that the opposite end of the current detector 34 is also connected to the positive electrode of the negative bias power supply 322 of the gate driver 32. This is because the reference potential of the processor 327 and a reference potential of the current detector 34 are made equal to each other.

When the discharge transistor 342 is open, charging of the capacitor 341 is permitted. In this case, the current flowing through the resistor 36 passes through the capacitor 341 and flows to the positive electrode of the negative bias power supply 322 of the gate driver 32. The capacitor 341 is charged, and the charging voltage rises. As the current flowing through the resistor 36 is larger, the temporal change rate of the charging voltage of the capacitor 341 becomes larger. As the current flowing through the resistor 36 is smaller, the temporal change rate of the charging voltage of the capacitor 341 becomes smaller.

When the discharge transistor 342 is closed, charging of the capacitor 341 is not permitted. In this case, the current flowing through the resistor 36 passes through the discharge transistor 342 and flows to the positive electrode of the negative bias power supply 322 of the gate driver 32. The capacitor 341 is discharged and the charging voltage of the capacitor 341 is initialized to zero volts.

One end of the capacitor 341 is connected to a positive terminal of a comparator 343, and the opposite end of the capacitor 341 is connected to a negative terminal of the comparator 343 through a reference voltage 344. When the charging voltage of the capacitor 341 rises and exceeds the reference voltage 344, the output of the comparator 343 switches from Low to High. The output of the comparator 343 is connected to a Data terminal of a latch circuit 345. In addition, an Out terminal of the latch circuit 345 is connected to the processor 327 of the gate driver 32.

The current detector 34 further includes a signal generator 346. The current detector 34 generates two types of signals in order to detect the temporal change rate of the charging voltage of the capacitor 341. A first signal repeats High for 10 us and Low for 90 us in a cycle of 100 us. A second signal repeats High for 3 us and Low for 97 us in a cycle of 100 us. The first signal is input to the discharge transistor 342, and the second signal is input to a Clock terminal of the latch circuit 345.

When the first signal is input to discharge transistor 342, the discharge transistor 342 repeats closing for 10 us and opening for 90 us in a cycle of 100 us. In addition, when the second signal is input to the Clock terminal of the latch circuit 345, the latch circuit 345 stores the output of the comparator 343 at the timing when the second signal rises from Low to High.

The timing when the second signal rises from Low to High is delayed by 30 us from the timing when the first signal falls from High to Low. Accordingly, the latch circuit 345 stores the output of the comparator 343 after a 30 us delay from the timing when the charging of the capacitor 341 is permitted.

When the current flowing through the resistor 36 is large, the charging voltage of the capacitor 341 becomes large in a short time of less than 30 us after the charging of the capacitor 341 is permitted. Therefore, the output of the comparator 343 is switched from Low to High. Thereafter, the latch circuit 345 stores the output of the comparator 343. The latch circuit 345 outputs a High signal from the Out terminal to the processor 327 of the gate driver 32. The processor 327 that has received the High signal reduces the gate drive speed of the switching semiconductor element 6a.

When the current flowing through the resistor 36 is small, the charging voltage of the capacitor 341 does not become large within a short time of less than 30 us after the charging of the capacitor 341 is permitted. Therefore, the output of the comparator 343 remains Low. The latch circuit 345 stores the output of Low output from the comparator 343. The latch circuit 345 outputs a Low signal from the Out terminal to the processor 327 of the gate driver 32. The processor 327 that has received the Low signal increases the gate drive speed of the switching semiconductor element 6a.

As described above, the current detector 34 in FIG. 3 can detect the magnitude of the current flowing through the resistor 36. By adjusting the delay time of the second signal relative to the first signal, a detection threshold of the current detector 34 can be adjusted. When the delay time is shortened, the threshold is raised. When the delay time is lengthened, the threshold is lowered.

In the current detector 34, when the capacitance of the capacitor 341 is increased, the capacitor voltage fluctuation when noise charges have entered becomes small. Therefore, when the capacitance of the capacitor 341 is large, the noise resistance of the current detector 34 increases, and the current of the resistor 36 can be accurately detected.

The signal generator 346 can be implemented using a CPLD, an ASIC, or a logic IC. At that time, a signal may be generated using the CPLD, the ASIC, or the logic IC included in the gate driver 32. In this manner, it is possible to reduce the number of components and to further downsize the gate drive circuit 3.

Figure 4:
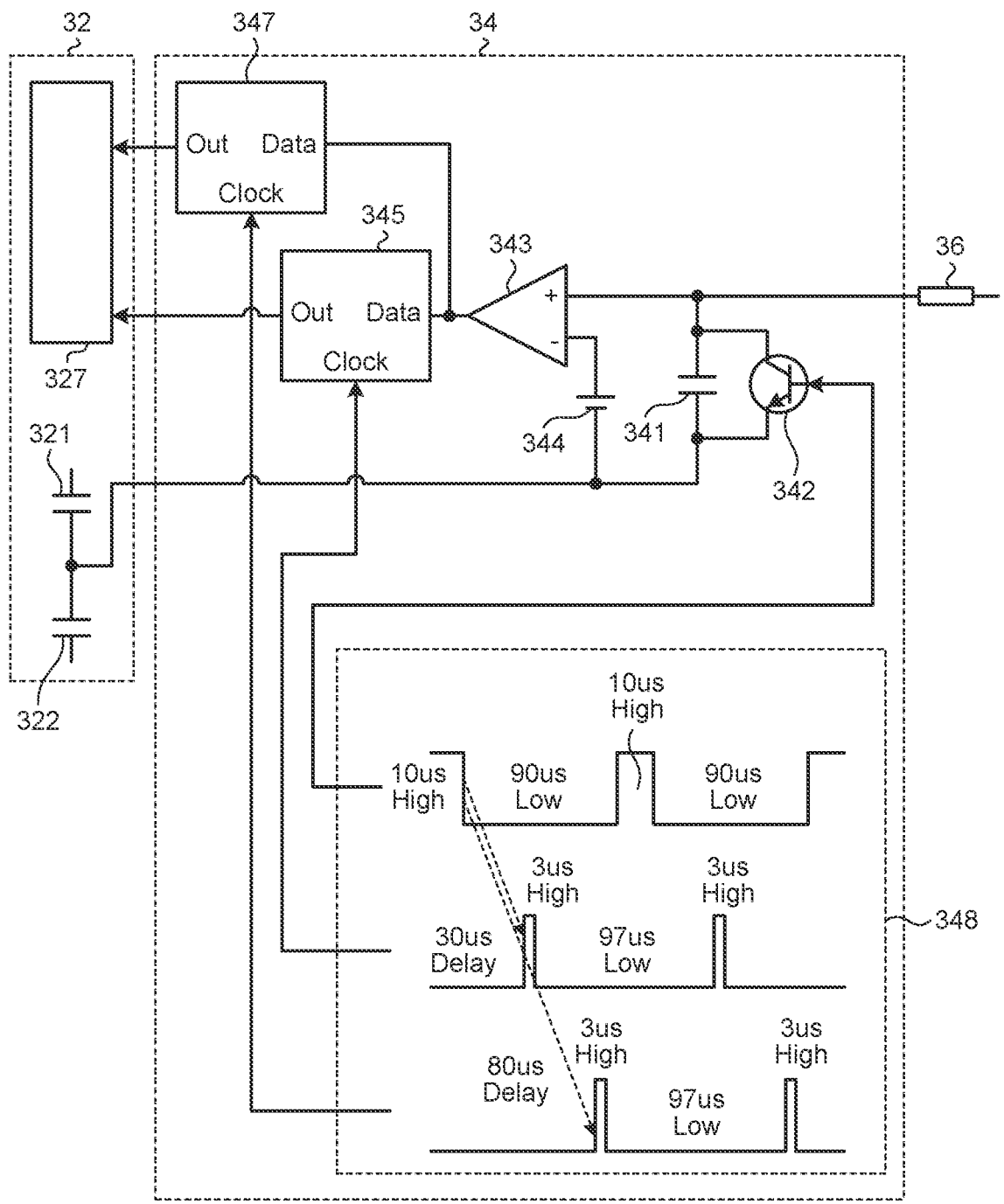
FIG. 4 is a diagram illustrating a second configuration example of the current detector according to the first embodiment together with peripheral components.

Another example of the current detector 34 is illustrated in FIG. 4. FIG. 4 is a diagram illustrating a second configuration example of the current detector 34 according to the first embodiment together with peripheral components. In FIG. 4, the same or equivalent elements as those illustrated in FIG. 3 are denoted by the same reference signs, and redundant description is appropriately omitted.

A first feature of the current detector 34 illustrated in FIG. 4 is to include a latch circuit 347 that is a second latch circuit. A Data terminal of the latch circuit 347 is connected to an output terminal of the comparator 343. With this configuration, the output of the comparator 343 is input to the Data terminal of the latch circuit 345 operating as a first latch circuit, and is also input to the Data terminal of the latch circuit 347 operating as the second latch circuit. In addition, an Out terminal of the latch circuit 347 is connected to the processor 327 of the gate driver 32.

A second feature of the current detector 34 illustrated in FIG. 4 is that a signal generator 348 is provided instead of the signal generator 346 and that the signal generator 348 generates three types of signals. A first signal and a second signal are similar to those output by the current detector 34 illustrated in FIG. 3. A third signal repeats High for 3 us and Low for 97 us in a cycle of 100 us. The third signal is input to a Clock terminal of the latch circuit 347.

The timing when the third signal rises from Low to High is delayed by 80 us from the timing when the first signal falls from High to Low. Accordingly, the latch circuit 347 stores the output of the comparator 343 after an 80 us delay from the timing when the charging of the capacitor 341 is permitted.

When the voltage applied to the switching semiconductor element 6a is large, the current flowing through the resistor 36 is large. When the charging voltage of the capacitor 341 becomes large within a short time of less than 30 us after the charging of the capacitor 341 is permitted, the output of the comparator 343 switches from Low to High. Thereafter, the latch circuits 345 and 347 store the output of the comparator 343. The latch circuit 345 outputs a High signal from the Out terminal to the processor 327, and the latch circuit 347 outputs a High signal from the Out terminal to the processor 327. The processor 327 that has received the High signal reduces the gate drive speed of the switching semiconductor element 6a.

When the voltage applied to the switching semiconductor element 6a is small, the current flowing through the resistor 36 is small, and the charging voltage of the capacitor 341 does not become large within a short time of less than 30 us after the charging of the capacitor 341 is permitted. Therefore, the output of the comparator 343 remains Low. The latch circuit 345 stores the output of the comparator 343. However, the charging voltage of the capacitor 341 continues to rise. The output of the comparator 343 is switched from Low to High before a long time of 80 us elapses. Thereafter, only the latch circuit 347 stores the output of High which is output from the comparator 343. The latch circuit 345 outputs a Low signal from the Out terminal to the processor 327, and the latch circuit 347 outputs a High signal from the Out terminal to the processor 327. At this time, the processor 327 increases the gate drive speed of the switching semiconductor element 6a.

When an open circuit failure occurs in the resistor 36 or when an open circuit failure occurs in the wiring connecting the resistor 36 and the current detector 34, the current flowing through the resistor 36 becomes zero. At this time, the charging voltage of the capacitor 341 does not become large, and the output of the comparator 343 remains Low. Thereafter, the latch circuits 345 and 347 store the output of the comparator 343. The latch circuit 345 outputs a Low signal from the Out terminal to the processor 327, and the latch circuit 347 outputs a Low signal from the Out terminal to the processor 327. At this time, the processor 327 reduces the gate drive speed of the switching semiconductor element 6a.

Here, a case where an open circuit failure occurs in the resistor 36 or a case where an open circuit failure occurs in the wiring connecting the resistor 36 and the current detector 34 is considered in the current detector 34 illustrated in FIG. 2. In these cases, even when the voltage applied to the switching semiconductor element 6a is large, the current flowing through the resistor 36 is zero. Therefore, the latch circuit 345 outputs a Low signal from the Out terminal to the processor 327. Accordingly, the processor 327 increases the gate drive speed of the switching semiconductor element 6a. Since the current zero state continues unless these open failures are repaired, the control for increasing the gate drive speed of the switching semiconductor element 6a is continued. As a result, voltage stress can be applied to the switching semiconductor element 6a.

Next, a case where an open circuit failure occurs in the resistor 36 or a case where an open circuit failure occurs in the wiring connecting the resistor 36 and the current detector 34 is considered in the current detector 34 illustrated in FIG. 4. As described above, the current detector 34 can detect that the current flowing through the resistor 36 is zero by the latch circuit 347 that is the second latch circuit. At this time, the gate driver 32 reduces the drive speed of the switching semiconductor element 6a. When these open failures are not repaired, the current zero state continues, but the gate drive speed of the switching semiconductor element 6a does not increase. Therefore, the possibility that voltage stress is applied to the switching semiconductor element 6a can be eliminated.

In the above description, it has been described that the current detector 34 detects that the current flowing through the resistor 36 is zero, but the detection threshold may not be strictly zero. The current detector 34 illustrated in FIG. 4 determines that the current is zero when the charging voltage of the capacitor 341 does not reach a set voltage within a prescribed time. This detection method may be used to detect zero current. In a case of the current detector 34 illustrated in FIG. 3, the configuration of the signal generator 346 is only required to be temporarily changed when the power conversion device is activated. That is, the delay time of the second signal relative to the first signal is adjusted to a long time. The detection threshold of the current detector 34 is lowered, and the current detector 34 can detect that the current flowing through the resistor 36 is zero. When the power conversion device is activated, an open circuit failure in the resistor 36 or an open circuit failure in the wiring connecting the resistor 36 and the current detector 34 can be detected. The gate driver 32 reduces the drive speed of the switching semiconductor element 6a. Therefore, the possibility that voltage stress is applied to the switching semiconductor element 6a can be eliminated. When these open failures are not to be detected, the configuration of the signal generator 346 is restored.

As described above, a gate drive circuit according to the first embodiment includes a resistor, a current detector that detects a current flowing through the resistor, and a gate driver. The gate driver applies an electric signal between the gate terminal and the source terminal to drive the gate of the switching semiconductor element. One end of the resistor is connected to the drain terminal, the opposite end of the resistor is connected to one end of the current detector, and the opposite end of the current detector is connected to the gate driver. The current detector outputs a detection value of the current to the gate driver. The gate driver changes the gate drive speed of the switching semiconductor element according to the detection value of the current. Specifically, when the current detector detects that the current flowing through the resistor is large, the drive speed of the switching semiconductor element is reduced. Similarly, when the current detector detects that the current flowing through the resistor is small, the drive speed of the switching semiconductor element is increased. Parasitic capacitance exists in an electronic circuit board on which the current detector is installed, and parasitic capacitance also exists in the wiring connecting the electronic circuit board and the gate driver. However, the current detector having a small input impedance can reduce the influence of the parasitic capacitance. In addition, the gate drive circuit according to the first embodiment does not require a capacitor to be connected to a resistor for voltage detection as in the prior art. Accordingly, by using the gate drive circuit according to the first embodiment, it is possible to obtain an effect of preventing an increase in size of a detector that detects a detection value representing a drive state of the switching semiconductor element while preventing a decrease in accuracy of the detection value.

In addition, by using the gate drive circuit according to the first embodiment, it is possible to reduce the switching loss while preventing the occurrence of an excessive surge voltage. Accordingly, since a cooler that cools the switching semiconductor element can be further reduced in size, it is possible to obtain an effect of further downsizing a power conversion device.

The current detector of the gate drive circuit may include a capacitor that receives a current flowing through the resistor. When the temporal change rate of the charging voltage of the capacitor is large, the current detector detects that the current flowing through the resistor is large. In addition, when the temporal change rate of the charging voltage of the capacitor is small, the current detector detects that the current flowing through the resistor is small. Since the current detector is configured using a circuit element, it is possible to quickly control the speed of the switching semiconductor element.

Note that, in the above configuration, it is assumed that an open circuit failure occurs in a resistor through which a current flows or that an open failure occurs in the wiring connecting the resistor and the current detector. The current detector can detect that the current flowing through the resistor is zero when the charging voltage of the capacitor does not reach a set voltage within a prescribed time. When the current detector detects that the current flowing through the resistor is zero, the gate drive circuit performs control to reduce the drive speed of the switching semiconductor element. Such control can eliminate the possibility of applying voltage stress to the switching semiconductor element.

Second Embodiment

Figure 5:
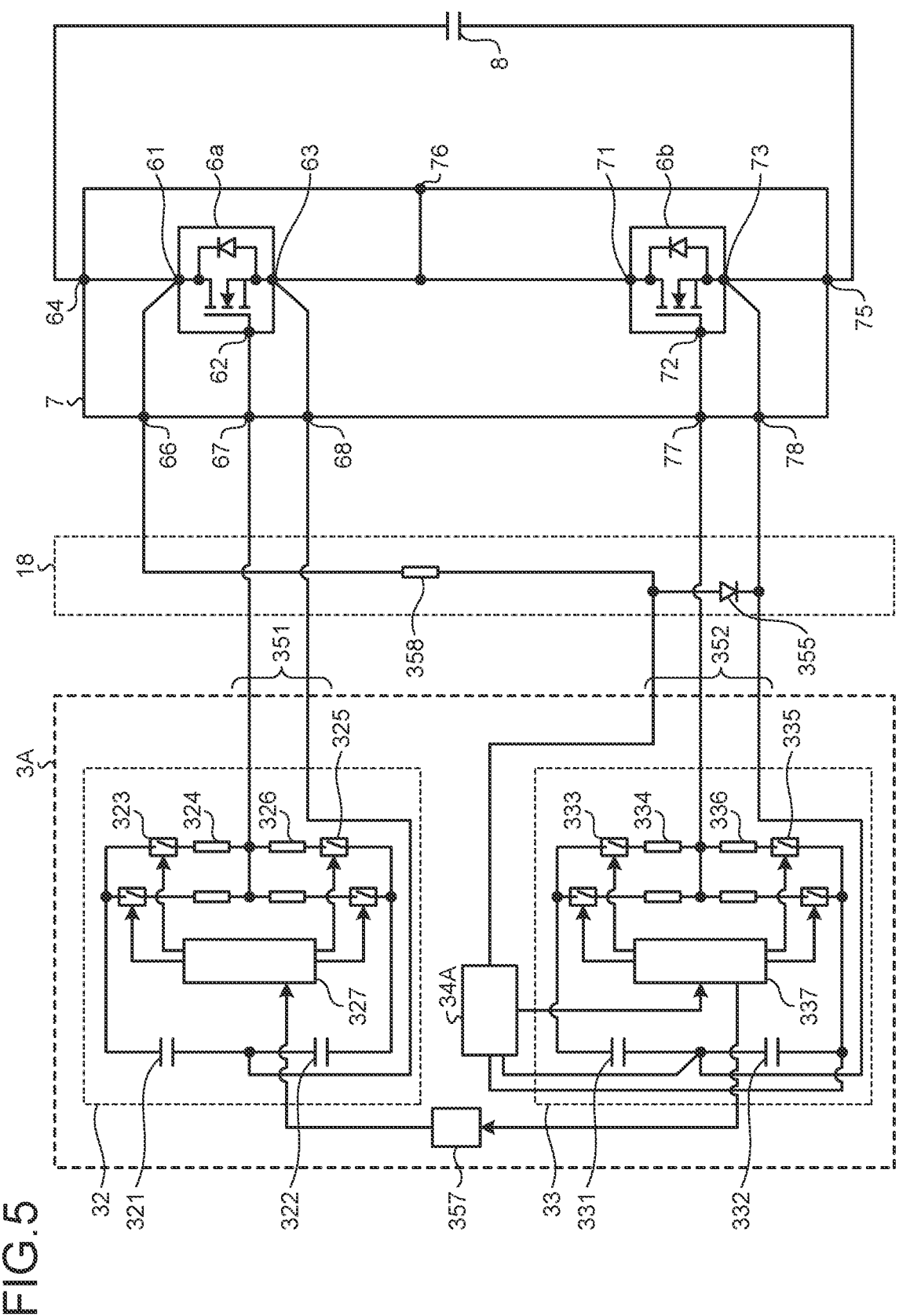
FIG. 5 is a diagram illustrating a detailed configuration of a gate drive circuit according to a second embodiment together with two switching semiconductor elements to be driven.

FIG. 5 is a diagram illustrating a detailed configuration of a gate drive circuit 3A according to a second embodiment together with two switching semiconductor elements 6a and 6b to be driven. In FIG. 5, the same or equivalent elements as those illustrated in FIG. 2 are denoted by the same reference signs, and redundant description is appropriately omitted.

The switching semiconductor element 6a that is a first switching semiconductor element is a MOSFET. The switching semiconductor element 6a includes the drain electrode 61 that is a first drain electrode, the gate electrode 62 that is a first gate electrode, and the source electrode 63 that is a first source electrode.

The switching semiconductor element 6b that is a second switching semiconductor element is also a MOSFET. The switching semiconductor element 6b includes a drain electrode 71 that is a second drain electrode, a gate electrode 72 that is a second gate electrode, and a source electrode 73 that is a second source electrode. The switching semiconductor elements 6a and 6b are connected in series and housed in an electrically insulating case to form a module 7.

The module 7 includes the drain main terminal 64, the drain terminal 66, the gate terminal 67 that is a first gate terminal, the source terminal 68 that is a first source terminal, a source main terminal 75, an output main terminal 76, a gate terminal 77 that is a second gate terminal, and a source terminal 78 that is a second source terminal.

The drain main terminal 64 and the drain terminal 66 are connected to the drain electrode 61 of the switching semiconductor element 6a. The gate terminal 67 is connected to the gate electrode 62 of the switching semiconductor element 6a.

The source electrode 63 of the switching semiconductor element 6a and the drain electrode 71 of the switching semiconductor element 6b are connected inside the module 7. The source electrode 63 and the drain electrode 71 are connected to the source terminal 68 and the output main terminal 76.

The gate terminal 77 is connected to the gate electrode 72 of the switching semiconductor element 6b. The source main terminal 75 and the source terminal 78 are connected to the source electrode 73 of the switching semiconductor element 6b.

A power capacitor 8 for storing DC power is provided outside the module 7. A positive electrode of the power capacitor 8 is connected to the drain main terminal 64, and a negative electrode of the power capacitor 8 is connected to the source main terminal 75. Although not illustrated in FIG. 5, a load, a reactor, another power capacitor, or another module is connected to the end of the output main terminal 76 of the module 7.

In the module 7, when the switching semiconductor element 6a is turned on, the output main terminal 76 outputs the potential of the positive electrode of the power capacitor 8. When the switching semiconductor element 6b is turned on, the output main terminal 76 outputs the potential of the negative electrode of the power capacitor 8. The power conversion device 1 according to the second embodiment performs power conversion processing by switching operation of the switching semiconductor elements 6a and 6b.

As illustrated in FIG. 5, the gate drive circuit 3A and a module external circuit 18 are provided outside the module 7.

The gate drive circuit 3A includes the gate driver 32 that is a first gate driver, a gate driver 33 that is a second gate driver, a current detector 34A, and a signal insulator 357. A detailed circuit configuration of the current detector 34A will be described later.

Similarly to the first embodiment, the gate driver 32 includes the positive bias power supply 321, the negative bias power supply 322, the on-drive switch 323, the on-drive gate resistor 324, the off-drive switch 325, the off-drive gate resistor 326, and the processor 327. Similarly, the gate driver 33 includes a positive bias power supply 331, a negative bias power supply 332, an on-drive switch 333, an on-drive gate resistor 334, an off-drive switch 335, an off-drive gate resistor 336, and a processor 337.

In the power conversion device 1 according to the second embodiment, each constituent element of the gate drive circuit 3A is placed on an electronic circuit board (not illustrated). In the gate drive circuit 3A, since the circuit and the components are installed on one board, the device can be downsized. In addition, since the circuit and the components are installed on one board, signal degradation is small, and the signal insulator 357 can be operated at high speed.

The module external circuit 18 includes a resistor 358 and an overvoltage prevention diode 355. In the power conversion device 1 according to the second embodiment, each constituent element of the module external circuit 18 is installed on an electronic circuit board (not illustrated) and placed on the module 7.

The module external circuit 18 includes conductors connected to the gate terminal 67 and the source terminal 68 of the module 7. These conductors are connected to the gate driver 32 through a first inter-board wiring group 351. In addition, the module external circuit 18 includes conductors connected to the drain terminal 66, the gate terminal 77, and the source terminal 78 of the module 7. These conductors are connected to the gate driver 33 through a second inter-board wiring group 352. With this configuration, gate driver 32 drives the switching semiconductor element 6a that is the first switching semiconductor element, and the gate driver 33 drives the switching semiconductor element 6b that is the second switching semiconductor element.

In the module external circuit 18, one end of the resistor 358 is connected to the drain terminal 66 of the module 7, and the opposite end of the resistor 358 is connected to one end of the current detector 34A through the second inter-board wiring group 352. One of the opposite ends of the current detector 34A is connected to a negative electrode of the negative bias power supply 332 of the gate driver 33, and the other of the opposite ends of the current detector 34A is connected to a positive electrode of the negative bias power supply 332 of the gate driver 33.

The voltage of the power capacitor 8 can be a high voltage of several hundred volts to several thousand volts. The voltage of the power capacitor 8 is always applied between the drain main terminal 64 and the source main terminal 75 of the module 7. This voltage is equivalent to the voltage applied between the drain electrode 61 of the switching semiconductor element 6a and the source electrode 73 of the switching semiconductor element 6b, and is equivalent to the voltage applied between the drain terminal 66 of the module 7 and the positive electrode of the negative bias power supply 332 in the gate driver 33.

A voltage drop occurring in the current detector 34A is a small value of zero volts or less than several tens of volts. In addition, the voltage between the positive electrode and the negative electrode of the negative bias power supply 332 in the gate driver 33 is a small value of less than several tens of volts. Therefore, the voltage of the power capacitor 8 is mainly applied to both ends of the resistor 358 of the module external circuit 18. The current flowing through the resistor 358 is proportional to the voltage of the power capacitor 8. The current detector 34A detects the current flowing through the resistor 358 and outputs the detected current value to the processor 337 of the gate driver 33.

The processor 337 of the gate driver 33 can always obtain information regarding the voltage of the power capacitor 8 from the output of the current detector 34A. The gate driver 33 changes the gate drive speed of the switching semiconductor element 6b according to the latest information regarding the voltage of the power capacitor 8. Accordingly, the switching loss of the switching semiconductor element 6b can be reduced. Accordingly, since a cooler that cools the switching semiconductor element 6b can be further reduced in size, the power conversion device can be further downsized.

Furthermore, the gate driver 33 delivers information regarding the output of the current detector 34A to the gate driver 32 through the signal insulator 357. That is, the gate driver 32 can always obtain the latest information regarding the voltage of the power capacitor 8 through the signal insulator 357. The gate driver 32 changes the gate drive speed of the switching semiconductor element 6a according to the latest information regarding the voltage of the power capacitor 8. Accordingly, the switching loss of the switching semiconductor element 6a can be reduced. Accordingly, since a cooler that cools the switching semiconductor element 6a can be further reduced in size, the power conversion device can be further downsized.

In this manner, since the current detector 34A is used as a detector that directly detects the voltage applied to the switching semiconductor element 6b in the second embodiment, the highly-accurate and downsized gate drive circuit 3A can be obtained.

As described above, the voltage of the power capacitor 8 is mainly applied to both ends of the resistor 358 in the module external circuit 18. Therefore, the voltage difference among the wirings included in the second inter-board wiring group 352 is a low voltage of less than several tens of volts. Therefore, the clearance distance in the wiring and the creepage distance in the wiring can be reduced. In addition, wiring with thin insulation coating can be used. In this manner, the wiring of the second inter-board wiring group 352 can be further downsized.

However, when an open circuit failure occurs in the current detector 34A, a current does not flow through the resistor 358 of the module external circuit 18. The potential at both ends of the resistor 358 becomes equivalent to the potential of the drain terminal 66 of the module 7 and can be a high potential of several hundred volts to several thousand volts. At this time, the voltage difference among the wirings included in the second inter-board wiring group 352 becomes excessive, and there is a risk of failure.

Therefore, the power conversion device 1 according to the second embodiment is configured to include the overvoltage prevention diode 355 in the module external circuit 18. In FIG. 5, an anode of the overvoltage prevention diode 355 is connected to a connection point between the resistor 358 and the current detector 34A. A cathode of the overvoltage prevention diode 355 is connected to the source terminal 78 of the module 7.

With this configuration, even if an open circuit failure occurs in the current detector 34A, a current flows through the path of the drain terminal 66 of the module 7, the resistor 358, the overvoltage prevention diode 355, and the source terminal 78 of the module 7. As described above, the voltage of the power capacitor 8 is mainly applied to both ends of the resistor 358 of the module external circuit 18. Accordingly, since the voltage difference among the wirings included in the second inter-board wiring group 352 is a low voltage of less than several tens of volts, the voltage difference among the wirings does not become excessive.

An overvoltage prevention resistor may be used instead of the overvoltage prevention diode 355. The resistance value of the overvoltage prevention resistor is made smaller than the resistance value of the resistor 358 of the module external circuit 18. In this case, the voltage of the power capacitor 8 is mainly applied to both ends of the resistor 358 of the module external circuit 18. Therefore, the voltage difference among the wirings included in the second inter-board wiring group 352 is a low voltage of less than several tens of volts. Therefore, it is possible to prevent the voltage difference among the wirings included in the second inter-board wiring group 352 from becoming excessive.

However, in a case of using the overvoltage prevention resistor, a current flows through the path of the positive electrode of the negative bias power supply 332 of the gate driver 33, the source terminal 78 of the module 7, the overvoltage prevention resistor, the current detector 34A, and the negative electrode of the negative bias power supply 332, when the power conversion device 1 is operating normally. Due to the influence of the current, the detection accuracy of the current detector 34A that detects the current flowing through the resistor 358 can deteriorate.

In contrast, in a case of using the overvoltage prevention diode 355, it is possible to prevent a current from flowing from the source terminal 78 of the module 7 to the current detector 34A. Accordingly, it is possible to prevent the detection accuracy of the current detector 34A from deteriorating. Therefore, it is desirable to use the overvoltage prevention diode 355 rather than the overvoltage prevention resistor.

Figure 6:
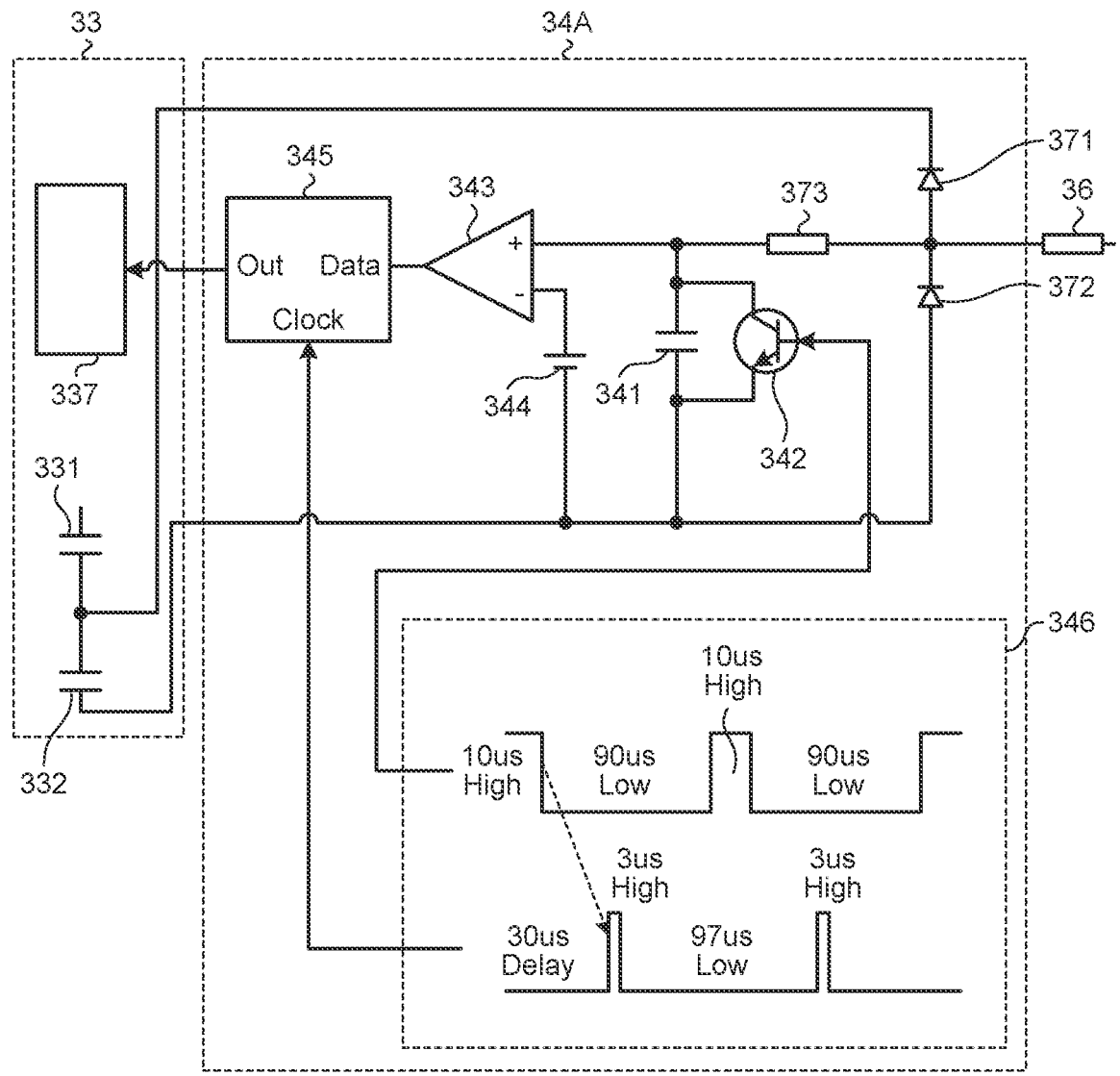
FIG. 6 is a diagram illustrating a configuration example of a current detector according to the second embodiment together with peripheral components.

FIG. 6 is a diagram illustrating a configuration example of the current detector 34A according to the second embodiment together with peripheral components. In FIG. 6, the same or equivalent elements as those illustrated in FIG. 3 are denoted by the same reference signs, and redundant description is appropriately omitted.

In FIG. 6, one end of the current detector 34A is connected to the resistor 358. In addition, one of the opposite ends of the current detector 34A is connected to the negative electrode of the negative bias power supply 332 of the gate driver 33, and the other of the opposite ends of the current detector 34A is connected to the positive electrode of the negative bias power supply 332 of the gate driver 33.

Since a reference potential of the processor 337 in the gate driver 33 is the negative electrode of the negative bias power supply 332, the opposite end of the current detector 34A is also connected to the negative electrode of the negative bias power supply 332 in the gate driver 33. With this connection, the reference potential of the processor 337 and a reference potential of the current detector 34A are made equal to each other.

The current detector 34A includes the capacitor 341, an upper diode 371, a lower diode 372, and an input resistor 373. The capacitor 341 and the resistor 36 of the module external circuit 18 are connected through the input resistor 373. The resistance value of the input resistor 373 is made smaller than the resistance value of the resistor 36 of the module external circuit 18.

A cathode of the upper diode 371 is connected to the positive electrode of the negative bias power supply 332, and an anode of the upper diode 371 is connected to a connection point between the input resistor 373 and the resistor 36. An anode of the lower diode 372 is connected to the negative electrode of the negative bias power supply 332, and a cathode of the lower diode 372 is connected to the connection point between the input resistor 373 and the resistor 36. The other configuration is similar to that of the current detector 34 in FIG. 3.

A characteristic of the current detector 34A according to the second embodiment is that a distance between a first circuit board (not illustrated) on which the gate drivers 32 and 33 are installed and a second circuit board on which the module external circuit 18 illustrated in FIG. 5 is mounted is large. As described above, the first circuit board and the second circuit board are connected by the first inter-board wiring group 351 and the second inter-board wiring group 352. If the wiring of the first and second inter-board wiring groups 351 and 352 is long, noise charges can enter due to electrostatic coupling with other terminals in the power conversion device 1. In this case, the potential of the wiring connecting the resistor 358 and the current detector 34A can rise or drop.

In the configuration of the current detector 34A in FIG. 6, when the potential of the wiring rises, the noise charges are discharged to the positive electrode of the negative bias power supply 332 through the upper diode 371. When the potential of the wiring drops, the noise charges are discharged to the negative electrode of the negative bias power supply 332 through the lower diode 372. Therefore, by using the current detector 34A in FIG. 6, it is possible to accurately detect the current flowing through the resistor 358 while reducing the adverse effect of noise charges.

In FIG. 6, the configuration including the upper diode 371, the lower diode 372, and the input resistor 373 is applied to the current detector 34 illustrated in FIG. 3, but the present disclosure is not limited thereto. The configuration including the upper diode 371, the lower diode 372, and the input resistor 373 may be applied to the current detector 34 illustrated in FIG. 4. Even with this configuration, the above effect can be obtained.

As described above, a gate drive circuit according to the second embodiment includes a resistor, a current detector that detects a current flowing through the resistor, and first and second gate drivers. The first gate driver applies an electric signal between a first gate terminal and a first source terminal to drive a gate of a first switching semiconductor element. The second gate driver applies an electric signal between a second gate terminal and a second source terminal to drive a gate of a second switching semiconductor element. One end of the resistor is connected to a first drain terminal, the opposite end of the resistor is connected to one end of the current detector, and the opposite end of the current detector is connected to the second gate driver. The current detector outputs a detection value of the current to the second gate driver, and the second gate driver changes the gate drive speed of the second switching semiconductor element according to the detection value. Specifically, when the current detector detects that the current flowing through the resistor is large, the first and second gate drivers reduce the drive speed of the first and second switching semiconductor elements. Similarly, when the current detector detects that the current flowing through the resistor is small, the drive speed of the first and second switching semiconductor elements is increased. With the gate drive circuit according to the second embodiment configured as described above, it is not necessary to connect a capacitor to a resistor for voltage detection as in the prior art. Therefore, by using the gate drive circuit according to the second embodiment, it is possible to obtain an effect of preventing an increase in size of a detector that detects a detection value representing a drive state of a switching semiconductor element while preventing a decrease in accuracy of the detection value.

The gate drive circuit may include a signal insulator that transmits information regarding the detected value of the current to the first gate driver. The second gate driver changes the drive speed of the second switching semiconductor element according to the information regarding the detection value detected by the current detector. In contrast, the first gate driver changes the drive speed of the first switching semiconductor element different from the second switching semiconductor element according to the information regarding the detection value obtained through the signal insulator. With this configuration, it is not necessary to provide the current detector in the first gate driver. Accordingly, it is possible to prevent the gate drive circuit from increasing in size in proportion to the number of switching semiconductor elements.

The configurations described in the above embodiments are merely examples and can be combined with other known techniques, the above embodiments can be combined with each other, and a part of the configurations can be omitted or changed without departing from the gist of the present disclosure. In the second embodiment, each constituent element of the gate drive circuit 3A is installed on an electronic circuit board, but the electronic circuit board may be placed on the module 7. Furthermore, the gate drive circuit 3A and the module external circuit 18 may be installed on the same electronic circuit board and placed on the module 7. With this configuration, it is possible to reduce the number of components.

REFERENCE SIGNS LIST 1 power conversion device; 2 inverter circuit; 3, 3A gate drive circuit; 4 control unit; 6, 7 module; 6a, 6b switching semiconductor element; 8 power capacitor; 10 DC power supply; 12 motor; 14 control signal; 16 drive signal; 18 module external circuit; 32, 33 gate driver; 34, 34A current detector; 36, 358 resistor; 61, 71 drain electrode; 62, 72 gate electrode; 63, 73 source electrode; 64 drain main terminal; 65, 75 source main terminal; 66 drain terminal; 67, 77 gate terminal; 68, 78 source terminal; 76 output main terminal; 321, 331 positive bias power supply; 322, 332 negative bias power supply; 323, 333 on-drive switch; 324, 334 on-drive gate resistor; 325, 335 off-drive switch; 326, 336 off-drive gate resistor; 327, 337 processor; 341 capacitor; 342 discharge transistor; 343 comparator; 344 reference voltage; 345, 347 latch circuit; 346, 348 signal generator; 351 first inter-board wiring group; 352 second inter-board wiring group; 355 overvoltage prevention diode; 357 signal insulator; 371 upper diode; 372 lower diode; 373 input unit resistor.

The invention claimed is:

1. A gate drive circuit to drive a semiconductor element module, the semiconductor element module including: at least one switching semiconductor element including a gate electrode, a drain electrode, and a source electrode; a gate terminal connected to the gate electrode; a drain terminal connected to the drain electrode; and a source terminal connected to the source electrode, the gate drive circuit comprising:
a resistor;
a current detector to detect a current flowing through the resistor; and
a gate driver to apply an electric signal between the gate terminal and the source terminal to drive the switching semiconductor element, wherein
one end of the resistor is connected to the drain terminal, an opposite end of the resistor is connected to one end of the current detector, an opposite end of the current detector is connected to the gate driver,
the current detector includes a capacitor to receive the current flowing through the resistor, the current detector outputs a detection value of the current detected based on a charging voltage of the capacitor to the gate driver, wherein the current detector detects that the current flowing through the resistor is large when a temporal change rate of a charging voltage of the capacitor is large, and the current detector detects that the current flowing through the resistor is small when the temporal change rate of the charging voltage of the capacitor is small, and
the gate driver changes a gate drive speed of the switching semiconductor element according to the detection value.

2. The gate drive circuit according to claim 1, wherein the gate driver reduces a drive speed of the switching semiconductor element when the current detector detects that the current flowing through the resistor is large, and increases the drive speed of the switching semiconductor element when the current detector detects that the current flowing through the resistor is small.

3. The gate drive circuit according to claim 2, wherein the gate drive circuit reduces the drive speed of the switching semiconductor element when the current detector detects that the current flowing through the resistor is zero.

4. The gate drive circuit of claim 1, comprising a signal insulator to transmit information regarding the detection value to another gate driver, wherein
the other gate driver changes a drive speed of another switching semiconductor element according to the information regarding the detection value obtained through the signal insulator.

5. The gate drive circuit according to claim 1, wherein the current detector detects that the current flowing through the resistor is zero when the charging voltage of the capacitor does not reach a set voltage within a prescribed time.

6. A power conversion device comprising:
the gate drive circuit according to claim 1; and
a power conversion main circuit including at least one switching semiconductor element driven by the gate drive circuit.

7. A gate drive circuit to drive a semiconductor element module which includes: a first switching semiconductor element including a first gate electrode, a first drain electrode, and a first source electrode; and a second switching semiconductor element including a second gate electrode, a second drain electrode, and a second source electrode, and in which the first source electrode is connected to the second drain electrode;
wherein the semiconductor element module includes:
a first gate terminal connected to the first gate electrode;
a first source terminal connected to the first source electrode;

a first drain terminal connected to the first drain electrode;

a second gate terminal connected to the second gate electrode; and a second source terminal electrically connected to the second source electrode, the gate drive circuit comprises:

a resistor;

a current detector to detect a current flowing through the resistor;

a first gate driver to apply an electric signal between the first gate terminal and the first source terminal to drive the first switching semiconductor element; and a second gate driver to apply an electric signal between the second gate terminal and the second source terminal to drive the second switching semiconductor element, one end of the resistor is connected to the first drain terminal, an opposite end of the resistor is connected to one end of the current detector, an opposite end of the current detector is connected to the second gate driver, the current detector includes a capacitor to receive the current flowing through the resistor, the current detector outputs a detection value of the current detected based on a charging voltage of the capacitor to the second gate driver, wherein the current detector detects that the current flowing through the resistor is large when a temporal change rate of a charging voltage of the capacitor is large, and the current detector detects that the current flowing through the resistor is small when the temporal change rate of the charging voltage of the capacitor is small, and the second gate driver changes a gate drive speed of the second switching semiconductor element according to the detection value.

8. The gate drive circuit according to claim 7, comprising a signal insulator to transmit information regarding the detection value to the first gate driver, wherein the first gate driver changes a drive speed of the first switching semiconductor element according to the information regarding the detection value obtained through the signal insulator.

9. The gate drive circuit according to claim 7, wherein

The first and second gate drivers reduce a drive speed of the first and second switching semiconductor elements when the current detector detects that the current flowing through the resistor is large, and increase the drive speed of the first and second switching semiconductor elements when the current detector detects that the current flowing through the resistor is small.

10. The gate drive circuit according to claim 9, wherein the first and second gate drivers reduce the drive speed of the first and second switching semiconductor elements when the current detector detects that the current flowing through the resistor is zero.

11. A power conversion device comprising:

the gate drive circuit according to claim 7; and a power conversion main circuit including at least one switching semiconductor element driven by the gate circuit.

\* \* \* \* \*